(12) United States Patent
Wunderlich

(10) Patent No.: US 11,283,874 B2
(45) Date of Patent: Mar. 22, 2022

(54) SYSTEMS AND METHODS FOR OPTIMIZING COOPERATIVE ACTIONS AMONG HETEROGENEOUS AUTONOMOUS CONNECTED MACHINES

(71) Applicant: NOBLIS, INC., Reston, VA (US)

(72) Inventor: Karl Eric Wunderlich, North Potomac, MD (US)

(73) Assignee: NOBLIS, INC., Reston, VA (US)

(*) Notice: Subject to any disclaimer, the term of this patent is extended or adjusted under 35 U.S.C. 154(b) by 311 days.

(21) Appl. No.: 16/504,682

(22) Filed: Jul. 8, 2019

(65) Prior Publication Data
US 2020/0014759 A1   Jan. 9, 2020

Related U.S. Application Data

(60) Provisional application No. 62/695,345, filed on Jul. 9, 2018.

(51) Int. Cl.
*H04L 29/08* (2006.01)
*G05D 1/00* (2006.01)
(Continued)

(52) U.S. Cl.
CPC ........ *H04L 67/12* (2013.01); *G05D 1/0088* (2013.01); *G05D 1/0291* (2013.01); *G05D 2201/0213* (2013.01)

(58) Field of Classification Search
CPC .... H04L 67/12; G05D 1/0088; G05D 1/0291; G05D 2201/0213; G05D 1/0297;
(Continued)

(56) References Cited

U.S. PATENT DOCUMENTS 6,032,097 A * 2/2000 Iihoshi ............... G05D 1/0293
                                                  701/96
8,195,342 B2 * 6/2012 Anderson ........... G05D 1/0088
                                                  701/1
(Continued)

OTHER PUBLICATIONS

International Search Report and Written Opinion dated Oct. 17, 2019, directed to International Application No. PCT/US2019/040805; 16 pages.
(Continued)

*Primary Examiner* — Yonel Beaulieu
(74) *Attorney, Agent, or Firm* — Morrison & Foerster LLP

(57) ABSTRACT

Disclosed herein are systems and methods for collectively optimizing cooperative actions among autonomous connected vehicles. A system may include a plurality of autonomous connected machines and/or vehicles that may establish a mesh network for communication amongst one another. Remote from the mesh network, the system may include a consortium configured to communicate with the mesh network, such as by cellular communication. The mesh network of connected vehicles may collectively receive, from the remote consortium, reliability information associated with the autonomous vehicles in the mesh network, and may collectively generate a shared map of the environment surrounding the plurality of autonomous connected vehicles in accordance with the reliability information. Based on the shared map, the mesh network of connected vehicles may collaboratively generate a collective navigation plan for the plurality of vehicles to navigate the environment.

33 Claims, 3 Drawing Sheets

(51) Int. Cl.
  *G05D 1/02* (2020.01)
  *H04L 67/12* (2022.01)
(58) Field of Classification Search
  CPC ...... G08G 1/20; G06Q 10/0635; G06Q 10/20; G06Q 50/30; G06Q 10/047; G06Q 10/063; G01C 21/34; G01C 21/32
  See application file for complete search history.

(56) References Cited

U.S. PATENT DOCUMENTS

| | | | |
|---|---|---|---|
| 8,224,500 B2* | 7/2012 | Anderson | G05D 1/0088 701/1 |
| 8,392,065 B2* | 3/2013 | Tolstedt | G05D 1/0214 701/41 |
| 8,989,972 B2* | 3/2015 | Anderson | A61B 5/1112 701/51 |
| 9,235,214 B2* | 1/2016 | Anderson | G05D 1/0088 |
| 9,928,746 B1 | 3/2018 | MacNeille et al. | |
| 2019/0012909 A1* | 1/2019 | Mintz | G08G 1/017 |
| 2019/0384299 A1* | 12/2019 | Maruyama | G05D 1/0088 |
| 2020/0357282 A1* | 11/2020 | Imanishi | B60W 60/00274 |
| 2021/0006332 A1* | 1/2021 | Pandit | H04B 10/1127 |

OTHER PUBLICATIONS

Shen et al. (Apr. 2017). "A General Framework for Multi-vehicle Cooperative Localization Using Pose Graph," located at ArXiv,.org Cornell University Library, 10 pages.
Shen et al. "Multi-vehicle Motion Coordination Using V2V cCommunication," 2015 IEEE Intelligent Vehicles Symposium (IV), Jun. 28-Jul. 1, 2015, Seoul, South Korea; pp. 1334-1341.

* cited by examiner

SYSTEMS AND METHODS FOR OPTIMIZING COOPERATIVE ACTIONS AMONG HETEROGENEOUS AUTONOMOUS CONNECTED MACHINES

CROSS-REFERENCE TO RELATED APPLICATIONS

This application claims the benefit of U.S. Provisional Application No. 62/695,345, filed on Jul. 9, 2018, the entire contents of which is incorporated herein by reference and for all purposes.

FIELD OF THE INVENTION

This relates generally to autonomous connected machines, and more specifically to systems and methods for collectively and cooperatively optimizing actions in an environment including heterogeneous autonomous connected vehicles by considering reliability of vehicle actions in previous cooperative engagements.

BACKGROUND OF THE INVENTION

As the number of semi-autonomous and fully autonomous vehicles and machines deployed on roadways and in other environments increases, those autonomous vehicles and machines currently rely on on-board sensors (e.g., radar, LIDAR, computer vision) in order to detect stationary or semi-permanent characteristics of their environment (e.g., barriers, buildings, terrain features, trees, etc.) and to detect or identify other mobile or impermanent objects (e.g., other vehicles, pedestrians, etc.). Similarly, autonomous vehicles currently rely on their on-board sensors, along with GPS systems and network connectivity used to access prefabricated maps, in order to plan and execute routes. Thus, known autonomous vehicle systems currently depend on each autonomous vehicle individually rely on its own on-board-sensors, GPS systems, and prefabricated maps of roadways in order to plan and execute navigational actions for each vehicle.

SUMMARY OF THE INVENTION

As described above, autonomous and semi-autonomous vehicles currently rely on a combination of GPS systems, on-board environmental sensors (e.g., radar, LIDAR, computer vision systems), and prefabricated maps (e.g., road maps associated with GPS routing software). On the basis of these inputs, autonomous and semi-autonomous vehicles determine navigational routes and/or automatically execute navigational actions, such as accelerating, braking, turning, etc.

In an ecosystem of heterogeneous autonomous connected machines, including machines that are mobile, autonomous, and connected (e.g., an autonomous passenger vehicle, an autonomous drone tasked with delivering goods, an autonomous chemical/biological/nuclear sensor robot traversing an urban emergency response scene, etc.), the heterogeneous machines in the system may find themselves near one another and may each seek to carry out their different intended tasks without conflicting with or colliding with one another. The machines may all be owned by different parties (e.g., private individuals, public or private transportation entities, delivery companies, law enforcement, emergency services, etc.) and may have different intended uses, designs, capabilities, speeds, and independent (e.g., passive) sensing capabilities.

Autonomous vehicles operating in accordance with the principles above, particularly those operating in heterogeneous environments, may be subject to several limitations and drawbacks. First, autonomous vehicles relying primarily on information gleaned from on-board sensors may have limited situational awareness. This is because, like human drivers, an autonomous vehicle relying primarily on information gleaned from on-board sensors may have to make assumptions about the desired, intended, and/or ongoing actions of other vehicles (whether human-controlled or autonomous) based only on the information detectable and observable by its sensors. This may create considerable uncertainty about the desired, intended, and/or ongoing actions of other vehicles, and may therefore require the autonomous vehicle to account for this uncertainty in planning its own actions, such as by traveling slowly and giving other vehicles very wide berths in order to mitigate the chances of collisions.

Furthermore, autonomous vehicles may have no way to assess the reliability or trustworthiness of other autonomous vehicles in their vicinity. For example, while autonomous vehicles may be expected to perform in a certain manner (e.g., by obeying traffic laws), some autonomous vehicles may be modified in new and unknown ways by users; may be incorrectly programmed in the first instance; may be programmed in accordance with new, modified, or different sets of rules or standards that are unfamiliar or unknown to surrounding vehicles; or may simply be malfunctioning. In any of these instances, the actual behavior of a vehicle may defy expected behavior. For this additional reason, uncertainty about the desired, intended, and/or ongoing actions of other vehicles may be created. When trust is low and uncertainty is high, vehicles must compensate by acting more conservatively (e.g., moving more slowly) to avoid the risk of collision.

Additionally, determination of motion paths and other actions by each individual vehicle in a heterogeneous, multi-vehicle environment may lead to less-than-optimized collective actions and outcomes. That is, each vehicle acting solely (or primarily) in its own self-interest (e.g., to minimize its own travel time at the expense of all other vehicles) may increase congestion and lead to collectively increased travel time for all vehicles in an environment. Furthermore, vehicles may generally lack information about the desires and intentions of surrounding vehicles, thereby leading to non-optimal and/or inequitable allocation of road space in time.

Accordingly, there is a need for improved systems and methods for optimizing cooperative actions among heterogeneous autonomous connected machines. Disclosed herein are systems and methods for optimizing cooperative actions among heterogeneous autonomous connected machines that may address one or more of the problems explained above.

The systems and methods disclosed herein may leverage a mesh network of heterogeneous autonomous connected vehicles and machines to collectively share information about current location and status, intended/desired route and/or motion paths, and information currently sensed by sensors. By sharing this information with one another via a mesh network open to nearby participating vehicles and/or machines, the participants in the mesh network may work together to collectively plan optimized motion paths for all mobile connected machines in the local environment associated with the mesh network. In some embodiments, collectively planning optimized routes and/or motion paths may include collectively creating and maintaining a collective uncertainty contour map that each machine in the network may use to determine a predicted likelihood of collision for a given location represented by the map. By avoiding areas of the collective uncertainty contour map that indicate a high or increased likelihood of collision, vehicles in the network may confidently travel with faster speeds and increased efficiency.

Collective route optimization, motion path optimization, and/or associated actions by a plurality of machines in a mesh network may be improved, in accordance with the systems and methods disclosed herein, by using one or more techniques to measure, monitor, and actively account for the reliability or trustworthiness of machines in the network. For example, machines in a network may verify the accuracy of readings by other machines and the fidelity/compliance of other machines to broadcasted intent and/or to collectively agreed-upon actions. In this way, machines in the network may build an electronic analogue of trust among one another, where the electronic analogue of trust increases over time as machines demonstrate their accuracy and reliability over time. As reliability is verified and trust increases, then improved route optimization and/or motion path optimization may be achieved as vehicles may be able to travel more closely to one another without unacceptably increasing the risk of collisions. As explained herein, reliability information may be calculated, processed, and/or distributed to vehicles in the mesh network by a remote entity such as a remote distributed consortium. Reliability information (including a record of requests for reliability information and responses to those requests) may be stored as part of a distributed ledger by multiple entities constituting the distributed consortium. Managing reliability information via a distributed consortium utilizing a shared distributed ledger may increase transparency, reliability, and security of the reliability information.

In some embodiments, a first system, for optimizing cooperative actions among autonomous connected vehicles, is provided, the first comprising: a plurality of autonomous connected vehicles, each of the plurality of vehicles comprising one or more processors configured to control navigation of the respective vehicle in an environment surrounding the plurality of autonomous connected vehicles; and a remote consortium comprising a plurality of processors configured to send and receive data, via a first electronic communication network, to and from one or more of the plurality of autonomous connected vehicles; wherein the plurality of autonomous connected vehicles is configured to: establish a mesh network comprising the plurality of autonomous connected vehicles; receive, from the remote consortium, via the first electronic communication network, data regarding a plurality of reliability metrics associated with the plurality of autonomous vehicles in the mesh network; collectively generate and store, via the mesh network, a map of the environment surrounding the plurality of autonomous connected vehicles, wherein the map is generated in accordance with one or more of the plurality of reliability metrics received from the remote consortium; and collectively generate and store, via the mesh network, based on the map of the environment, a collective navigation plan for the plurality of autonomous connected vehicles to navigate the environment.

In some embodiments of the first system, a first autonomous vehicle of the plurality of autonomous connected vehicles is configured to broadcast, to a second one of the plurality of autonomous connected vehicles, via the mesh network, information regarding a current status of the first vehicle.

In some embodiments of the first system, the second autonomous vehicle is configured to transmit, to the remote consortium, verification data based on a comparison of the broadcasted information regarding a current status of the first vehicle to information regarding the current status of the first vehicle detected by one or more sensors of the second vehicle; wherein the verification data is used by the remote consortium to generate or modify one or more of the plurality of reliability metrics.

In some embodiments of the first system, a first autonomous vehicle of the plurality of autonomous connected vehicles is configured to broadcast, from a first one to a second one of the plurality of autonomous connected vehicles, via the mesh network, information detected by one or more sensors of the first vehicle.

In some embodiments of the first system, the second autonomous vehicle is configured to transmit, to the remote consortium, verification data based on a comparison of the broadcasted information detected by one or more sensors of the first vehicle to information detected by one or more sensors of the second vehicle; wherein the verification data is used by the remote consortium to generate or modify one or more of the plurality of reliability metrics.

In some embodiments of the first system, a first autonomous vehicle of the plurality of autonomous connected vehicles is configured to broadcast, from a first one to a second one of the plurality of autonomous connected vehicles, via the mesh network, information regarding an intended navigation action of the first vehicle.

In some embodiments of the first system, the second autonomous vehicle is configured to transmit, to the remote consortium, verification data based on a comparison of the broadcasted information regarding the intended navigation action of the first vehicle to information regarding an observed navigation action of the first vehicle detected by one or more sensors of the second vehicle; wherein the verification data is used by the remote consortium to generate or modify one or more of the plurality of reliability metrics.

In some embodiments of the first system, generating the map of the environment comprises associating a region of the environment with a calculated probability that an object will be present in the region during a given period in time.

In some embodiments of the first system, the probability that an object will be present in the region during the given period in time is calculated in accordance with a reliability metric of a vehicle of the plurality of vehicles that indicated that the object will be present at the given during the given period in time.

In some embodiments of the first system, generating the collective navigation plan comprises assigning priority to occupy a location in the environment to a selected vehicle of the plurality of autonomous connected vehicles to the exclusion of a non-selected vehicle of the plurality of autonomous connected vehicles.

In some embodiments of the first system, generating the collective navigation plan comprises determining a number of tokens to transfer from the selected vehicle to the non-selected vehicle.

In some embodiments of the first system, determining the number of tokens to transfer comprises: generating, by each of the selected vehicle and the non-selected vehicle, a respective sealed bid of a respective number of tokens; identifying the selected vehicle as the vehicle that generated the highest sealed bid; identifying the non-selected vehicle that vehicle that generated the second-highest sealed bid; determining the number of tokens to transfer from the selected vehicle to the non-selected vehicle as equal to one greater than the number of tokens bid by the non-selected vehicle.

In some embodiments of the first system, the plurality of autonomous connected vehicles is configured to transmit information regarding the collective navigation plan to the remote consortium.

In some embodiments of the first system, the remote consortium is configured to store the transmitted information regarding the collective navigation plan as part of a distributed ledger In some embodiments of the first system, the plurality of reliability metrics are stored by the remote consortium as a plurality of vectors, each of the plurality of vectors associated with a respective one of the plurality of autonomous connected vehicles in the mesh network, wherein each of the vectors comprises a plurality of vector components, each of the plurality of vector components indicating a reliability of a respective characteristic the associated autonomous connected vehicle.

In some embodiments of the first system, the remote consortium is configured to store the plurality of reliability metrics as part of a distributed ledger.

In some embodiments of the first system, establishing the mesh network comprises defining the mesh network to include automated connected vehicles within a physical proximity boundary.

In some embodiments of the first system, the physical proximity boundary is defined in accordance with one of: a range of a communication component of one or more of the autonomous connected vehicles, and a range of a sensor of one or more of the autonomous connected vehicles.

In some embodiments of the first system, the mapped environment surrounding the plurality of autonomous connected vehicles corresponds to the area within the physical proximity boundary.

In some embodiments of the first system, establishing the mesh network comprises configuring the mesh network to include automated connected vehicles having one of: different electronic characteristics amongst one another; different sensor capabilities amongst one another; different communication capabilities amongst one another; different affiliation amongst one another; and different ownership amongst one another.

In some embodiments of the first system, each one of the plurality of reliability metrics is respectively associated with a respective one of the plurality of autonomous connected vehicles.

In some embodiments of the first system, the first electronic communication network comprises a cellular communication network.

In some embodiments of the first system, the mesh network is configured to allow transmission of data amongst the plurality of autonomous connected vehicles via a first electronic communication scheme different from an electronic scheme of the first electronic communication network.

In some embodiments of the first system, the mesh network is configured to allow transmission of data amongst the plurality of autonomous connected vehicles via short-wave radio transmission.

In some embodiments of the first system, the plurality of autonomous connected vehicles is further configured to navigate the environment in accordance with the map of the environment.

In some embodiments, a first method, for optimizing cooperative actions among autonomous connected vehicles, is provided, the first method comprising: at a system comprising a plurality of autonomous connected vehicles, each of the plurality of vehicles comprising one or more processors configured to control navigation of the respective vehicle in an environment surrounding the plurality of autonomous connected vehicles: establishing a mesh network comprising the plurality of autonomous connected vehicles; receiving, from a remote consortium comprising a plurality of processors configured to send and receive data, via a first electronic communication network, to and from one or more of the plurality of autonomous connected vehicles, data regarding a plurality of reliability metrics associated with the plurality of autonomous vehicles in the mesh network; collectively generating and storing, via the mesh network, a map of the environment surrounding the plurality of autonomous connected vehicles, wherein the map is generated in accordance with one or more of the plurality of reliability metrics received from the remote consortium; and collectively generating and storing, via the mesh network, based on the map of the environment, a collective navigation plan for the plurality of autonomous connected vehicles to navigate the environment In some embodiments, a first non-transitory computer-readable storage medium, for optimizing cooperative actions among autonomous connected vehicles, is provided, the first non-transitory computer-readable storage medium storing instructions that, when executed by one or more processors of one or more of a plurality of autonomous connected vehicles, cause one or more of the plurality of autonomous connected vehicles to: establish a mesh network comprising the plurality of autonomous connected vehicles; receive, from the remote consortium, via the first electronic communication network, data regarding a plurality of reliability metrics associated with the plurality of autonomous vehicles in the mesh network; collectively generate and store, via the mesh network, a map of an environment surrounding the plurality of autonomous connected vehicles, wherein the map is generated in accordance with one or more of the plurality of reliability metrics received from the remote consortium; and collectively generate and store, via the mesh network, based on the map of the environment, a collective navigation plan for the plurality of autonomous connected vehicles to navigate the environment.

In some embodiments, a second system, for tracking reliability of autonomous connected vehicles, is provided, the second system comprising: a plurality of autonomous connected vehicles, each of the plurality of vehicles comprising one or more processors configured to control navigation of the respective vehicle in an environment surrounding the plurality of autonomous connected vehicles; wherein a first autonomous vehicle of the plurality of autonomous connected vehicles is configured to: receive a transmission of first data, via a mesh network, from a second autonomous vehicle of the plurality of autonomous connected vehicles, the first data regarding a characteristic; detect, via a sensor of the first autonomous vehicle, second data regarding the characteristic; compare the first data and the second data to generate a comparison included in a report regarding the reliability of the second autonomous vehicle; and transmit, via an electronic communication network different from the mesh network, to one or more remote servers, the report regarding the reliability of the second autonomous vehicle.

In some embodiments of the second system, the characteristic is a physical characteristic of the second autonomous vehicle.

In some embodiments of the second system, the characteristic is a physical characteristic of an environmental object different from the first autonomous vehicle and the second autonomous vehicle.

In some embodiments of the second system: the characteristic is an intended action of the second autonomous vehicle; the first data regarding the characteristic is an advance indication that the second autonomous vehicle will perform the intended action; and the second data regarding the characteristic is an observation of whether or not the second autonomous vehicle performed the intended action.

In some embodiments, a second method, for tracking reliability of autonomous connected vehicles, is provided, the second method comprising: at a first autonomous vehicle included in a plurality of autonomous connected vehicles, each of the plurality of vehicles comprising one or more processors configured to control navigation of the respective vehicle in an environment surrounding the plurality of autonomous connected vehicles: receiving a transmission of first data, via a mesh network, from a second autonomous vehicle of the plurality of autonomous connected vehicles, the first data regarding a characteristic; detecting, via a sensor of the first autonomous vehicle, second data regarding the characteristic; comparing the first data and the second data to generate a comparison included in a report regarding the reliability of the second autonomous vehicle; and transmitting, via an electronic communication network different from the mesh network, to one or more remote servers, the report regarding the reliability of the second autonomous vehicle.

In some embodiments, a second non-transitory computer-readable storage medium, for tracking reliability of autonomous connected vehicles, is provided, the second non-transitory computer-readable storage medium storing instructions that, when executed by a first autonomous vehicle included in a plurality of autonomous connected vehicles, cause first autonomous connected vehicle to: receive a transmission of first data, via a mesh network, from a second autonomous vehicle of the plurality of autonomous connected vehicles, the first data regarding a characteristic; detect, via a sensor of the first autonomous vehicle, second data regarding the characteristic; compare the first data and the second data to generate a comparison included in a report regarding the reliability of the second autonomous vehicle; and transmit, via an electronic communication network different from the mesh network, to one or more remote servers, the report regarding the reliability of the second autonomous vehicle.

In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION OF THE INVENTION

Described herein are exemplary embodiments of system for optimizing cooperative actions among heterogeneous autonomous connected machines, which may address the problems and shortcomings of known autonomous vehicle and machine systems and methods described above.

Figure 1:
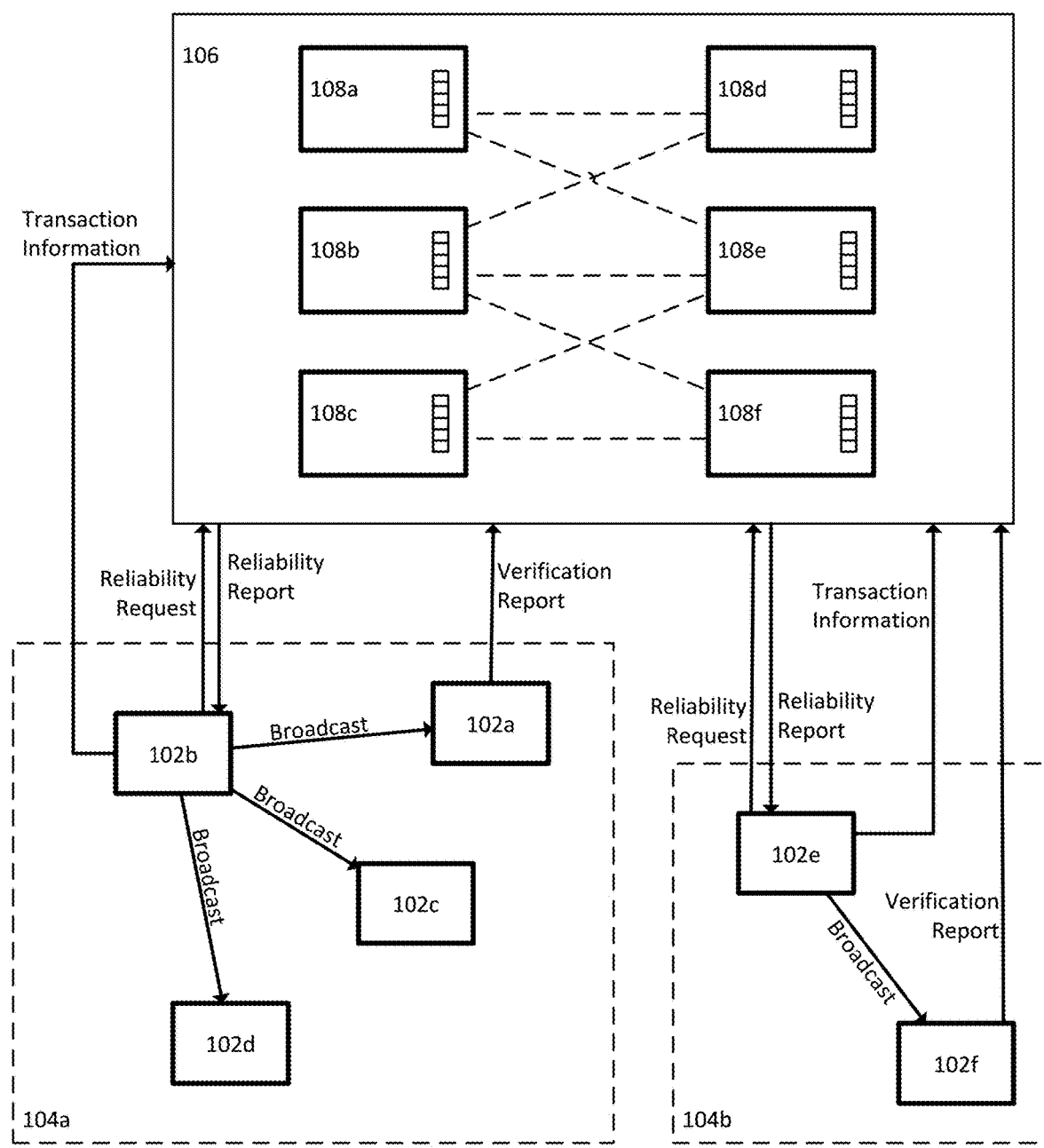
FIG. 1 depicts a system for optimizing cooperative actions among heterogeneous autonomous connected machines, in accordance with some embodiments.

FIG. 1 depicts a system 100 for optimizing cooperative actions among heterogeneous autonomous connected machines, in accordance with some embodiments.

As shown, system 100 may include machines 102a-102f grouped into two mesh networks 104a and 104b, as well as remote consortium 106 including consortium members 108a-108f. In the example shown in FIG. 1, there are six machines 102a-102f grouped into two mesh networks 104a and 104b. However, in some embodiments, system 100 may include any number of machines 102 greater than two. In some embodiments, system 100 may include hundreds, thousands, or tens of thousands or more individual machines. Similarly, while the example shown in FIG. 1 shows machines 102 grouped into two mesh networks 104a and 104b, system 100 in some embodiments may include any number of mesh networks, such hundreds, thousands, or tens of thousands or more mesh networks.

As described in detail below, machines 102a-102f may be heterogeneous autonomous machines (e.g., vehicles) that may communicate with other machines via their shared mesh networks in order to share information, to collectively generate a shared uncertainty map indicating risk levels associated with traveling into various locations of their surrounding environment, and to collectively plan navigational paths and plan navigational actions. As further described in detail below, machines 102a-102f may communicate via one or more network communication protocols with remote consortium 106, comprising consortium member 108a-108f, in order to transmit verification reports about other machines in the area and in order to request and receive reliability reports (built based on a body of verification reports reported in other collective encounters) about other machines in the area. As explained below, the reliability reports, which may indicate the reliability (e.g., trustworthiness, accuracy, fidelity) or a machine in the ecosystem, may be used to weight the collective uncertainty map.

Machines 102a-102f may be any computerized devices configured to participate in system 100 by using one or more sensors (e.g., radar, LIDAR, computer vision) to detect characteristics of the surrounding environment, sending mesh-network messages between one another, and/or by exchanging information with remote consortium 106. Each of machines 102a-102f may comprise one or more processors configured to control communication via a mesh network, communication via one or more network communication protocols (e.g., communication with remote consortium 106), receipt and transmission of GPS data, and/or machine functionalities such as acceleration, braking, and/or steering for autonomous vehicles.

In some examples, one or more of machines 102a-102f may be an autonomous (e.g., semi-autonomous or fully-autonomous) vehicle, such as an autonomous passenger vehicle configured to execute routing functions (e.g., controlling its acceleration, braking, steering) to plan and execute a path of travel. As used herein, the term "autonomous vehicle" may refer to any vehicle configured to control acceleration, braking, or steering with no human intervention or with only partial human intervention; the term "connected vehicle" may refer to any vehicle configured for electronic communication with one or more other entities outside the vehicle itself. While the present disclosure discusses techniques by which autonomous connected vehicles may make collective decisions in reliance on and in connection with one another, said vehicles may still be referred to as "autonomous vehicles."

In some embodiments, autonomous vehicles in system 100 may include autonomous passenger vehicles, autonomous cargo/delivery vehicle, autonomous drones (e.g., autonomous aerial vehicles), autonomous chemical/biological/nuclear sensor robots, autonomous bomb-squad robots, autonomous military vehicles, autonomous law enforcement vehicles, autonomous construction vehicles, autonomous warehouse robots, autonomous dock robots, and/or any other mobile autonomous machine.

In some examples, one or more of machines 102a-102f may be a stationary machine, rather than an autonomous vehicle. Despite being stationary, such a machine may nevertheless be configured to participate in system 100 by using one or more sensors (e.g., radar, LIDAR, computer vision) to detect characteristics of the surrounding environment, sending mesh-network messages between one another, and/or by exchanging information with remote consortium 106. In some embodiments, a stationary machine in system 100 may include a traffic monitoring device, a speed detection sensor, a camera system designed to identify and classify objects and movements, a surveillance device, and/or any other stationary machine.

As mentioned above, one or more of machines 102a-102f may be heterogeneous amongst each other. That is, machines 102a-102f may differ between one another as to their physical characteristics (e.g., size, shape, mass, etc.), their physical capabilities (e.g., acceleration, braking, speed, turning, aerial travel capabilities), their electronic characteristics (e.g., computation speeds, native routing/navigation algorithms), their sensor capabilities (e.g., radar, LIDAR, computer vision), and/or their communication capabilities (e.g., radar, LIDAR, computer vision, mesh-network communication, network communication, GPS communication). In some embodiments, one or more of machines 102a-102f may be owned by, manufactured by, maintained by, and/or operated by different entities from one another. In some embodiments, one or more of machines 102a-102f may have no connection to or prior interaction with one another before encountering one another into system 100.

As shown, machines 102a-102f may be grouped into two mesh networks 104a and 104b. Mesh networks 104a and 104b may be any local network in which autonomous vehicles and machines (e.g., machines 102a-102f) may interconnect with one another as nodes.

One or more mesh networks in system 100 may be mobile ad hoc networks (MANETs) (e.g., wireless ad hoc networks) and may rely on any one or more wireless communication schemed (e.g., wireless mediums, wireless protocols, etc.) for sending messages between nodes. For example, the mesh networks may use one or more of short-range radio communication, WLAN, Wi-Fi, Bluetooth, cellular communication, LTE, or other wireless communication schemes as a part of one or more wireless communication networks.

One or more mesh networks in system 100 may be continuously self-configuring. In some embodiments, nodes in mesh networks 104a and 104b may connect to one another dynamically and non-hierarchically, and may be free to join and/or leave the network as needed. As discussed further below, machines in system 100 may in some embodiments self-organize into subsets that define the mesh networks in system 100. As discussed further below, the determination as to which machines in the system are grouped into which mesh network may depend on the communication capabilities of one or more machines, the proximity of one or more machines, the velocity of one or more machines, and/or logical considerations regarding the environment (e.g., roadways, obstacles, etc.) and the manner in which the machines may physically interact with one another in the environment. In some embodiments, as discussed further below, one or more machines may dynamically join and/or leave different mesh networks in system 100 as the machines move with respect to one another. In some embodiments, a mesh network may cease to exist during operation of system 100, while in some embodiments a new mesh network may be created during system 100.

One or more of the mesh networks in system 100 may be fully mesh networks in which each node in the network is connected to every other node in the network, or they may be partial mesh networks in which one or more nodes in the network is connected to fewer than every other node in the network. In some embodiments, one or more of the mesh networks 104a and 104b may be partially or completely overlapping with one or more other mesh networks in system 100 (including with one another, though this is not shown in the illustrated example). In some embodiments, one or more of the mesh networks may be non-overlapping with one or more other mesh networks in system 100.

In some embodiments, machines in system 100 (e.g., machines 102a-102f) may be configured to transmit information amongst one another once they are communicatively coupled together into one or more mesh networks. Machines in a common mesh network may broadcast various kinds of information to one or more (including to all) of the other machines in the network. As explained below, machines in a mesh network may broadcast (1) status information, (2) intent information, and (3) sensor information.

First, machines in a mesh network may broadcast information about their status. Status information may include information about immutable characteristics, such as vehicle type, vehicle size, vehicle affiliation, vehicle ownership, vehicle capabilities (e.g., acceleration, braking, speed, turning capabilities, etc.), vehicle software and hardware capabilities, sensor capabilities, etc. Status information may also include information about dynamic characteristics, such as current location, current velocity, current direction, current fuel supply, current battery status, etc. Status information may also include information about a current planned path and/or route reflecting a future intent of the vehicle (although this may, in some embodiments overlap with intent information as discussed below).

Second, machines in a mesh network may broadcast information about their intent. That is, a machine may broadcast information about its intent (e.g., its current plan and/or its intended or desired plan) regarding future conduct. Future conduct may include any intended navigational function such as acceleration, braking, turning, pausing, a desired roadway or pathway, and/or a desired destination or endpoint.

In some embodiments, in addition to an intended navigational function, intent information may also include an urgency metric associated with one or more of the intended functions. An urgency metric may be any indicator of a level of desire or a level of urgency for executing an intended function. For example, a vehicle that needs to arrive at its destination in a shorter period of time may assign a higher urgency metric to one or more of its desired navigational functions. On the other hand, a vehicle that has no deadline for arrival may assign a lower urgency metric to one or more of its desired navigational functions. In some embodiments, a specific navigational function may be assigned a higher or lower urgency metric based on a layout of a roadway or an environment.

For example, in some situations, a vehicle at a four-way intersection may in some embodiments may be able to reach its intended destination relatively easily (e.g., in a similar amount of time and by traversing a similar total distance) regardless of whether it travels straight from the intersection or turns left. This vehicle may assign a low urgency metric to its intended action at the intersection. However, in some situations, a vehicle at a four-way intersection may in some embodiments be delayed from reaching its destination by a large amount of time if it turns instead of traveling straight. This vehicle may therefore assign a high urgency metric to its intended action at the intersection.

In some embodiments, urgency metrics for public transportation vehicles, law enforcement vehicles, emergency response vehicles, and/or military vehicles may be increased generally and/or in accordance with situational considerations (e.g., an emergency vehicle responding to an emergency call, versus one that is not).

In some embodiments, urgency metrics may be associated with or expressed by the exchange of an electronic representation of value between vehicles in a mesh network and or vehicles in the system at large. For example, machines in a system (e.g., system 100) may be configured to exchange or trade tokens amongst one another in accordance with collectively agreed-upon courses of action. In some embodiments, the tokens may be associated with the right to occupy space in the environment (e.g., a portion of a roadway) for a unit time. In some embodiments, tokens may represent a measurement of area times time, which may be measured in units of meters-squared seconds, m2 s. In some embodiments, the tokens may be cryptographically secured. In some embodiments, the tokens may be traded as a cryptocurrency associated with the right to occupy space in the environment (e.g., a portion of a roadway) for a unit time, without being associated with or tied to a monetary value of a currency. In some embodiments, the tokens may be associated with both the right to occupy space in the environment (e.g., a portion of a roadway) for a unit time and with a monetary value of a currency. In some embodiments, the tokens may be a cryptocurrency.

When using tokens associated with the right to occupy space in time, an urgency metric associated with a vehicle's intended/desired action vehicles may in some embodiments be expressed by an offer to exchange a certain number of tokens to one or more other vehicles in order to occupy the intended space in the intended time. For example, a first vehicle may in some embodiments offer or bid a certain number of tokens for the right to execute an intended/desired action with priority over other vehicles whose intended/desired actions may conflict with the intended/desired action of the first vehicle. In some embodiments, vehicles in the same system (e.g., vehicles in the same mesh network of the system) may offer bids, such as sealed bids, to execute desired conflicting actions, and higher bidders may be granted priority to perform the desired action before lower bidders. Generally, lower-bidding vehicles may be assigned poorer, slower, less direct, paths when superior, faster, or more direct paths are in conflict with identified high-priority allocated paths that have been assigned to higher-bidding vehicles. In some embodiments, the value of all bids for a contested space (or plurality of associated spaces) in the environment may be summed together, and the total value may be distributed amongst vehicles and/or machines associated with the space (or spaces) in accordance with a predefined distribution algorithm, such as by distributing value to vehicles that are assigned poorer, slower, and/or less direct paths. In some embodiments, a higher bidder may transmit a number of tokens to a lower bidder equal to one greater than the number of tokens bid by the lower bidder, regardless of whether the maximum bid of the higher bidder exceeded the bid of the lower bidder by more than one token. In some embodiments, bids may be weighted in accordance with a machine's reliability metric, such that machines that have proven reliable are rewarded by the system with easier access to road space in time, thereby further incentivizing participation in the system and further increasing overall efficiency of travel in the environment.

In some embodiments, the exchange of tokens, or the exchange of other electronic representations of value, may be executed over a mesh network (e.g., mesh networks 104a and 104b) directly between transacting vehicles. In some embodiments, the exchange of tokens or the like may be negotiated over a mesh network and then executed and/or recorded wholly or partly by a remote system, such as consortium 106, or any other remote exchange system or broker system in electronic communication (e.g., cellular communication) with the transacting vehicles. In some embodiments, a record of exchanges of tokens or the like between vehicles and/or machines in the systems may be maintained as part of a distributed ledger, including but not limited to the distributed ledger maintained by remote consortium 106 discussed elsewhere herein.

Turning now from status information and intent information, a third type of information that may be broadcast by machines in a mesh network of the system is information regarding readings from their sensors. That is, machines may broadcast information about data detected by their sensors (e.g., radar sensors, LIDAR sensors, computer vision sensors) such that the information may be received by and used by other machines in the system. By broadcasting sensor information, even if a foreign object (e.g., pedestrian, animal, non-connected vehicle) in the environment is only in a line of sight of a single autonomous connected vehicle connected to the system, all of the vehicles sharing a mesh network with the single vehicle that can see the object may nonetheless be made aware of the presence of the foreign object.

In some embodiments, as discussed further herein, machines and/or vehicles sharing a mesh network may rely on sensor information broadcast by one or more (or all) of the machines in the mesh network in order to collectively plan routes and/or motion paths and to determine actions of each of the vehicles in the mesh network. That is, by collaboratively building a collective situational awareness of the environment of all of the vehicles in the mesh network, a route and/or motion path for each of the vehicles may be planned in accordance with all of the information detected about the environment, regardless of which sensors on which vehicle initially gathered the information about the environment. As discussed further herein, sensor information pooled from all of the machines in a mesh network may be used to build a collective, shared, dynamically-updated map of the environment that any one or more vehicles in the mesh network (or in the system at large) may rely on when navigating the environment.

Thus, as explained above, any one or more of the machines in a mesh network of the system may broadcast (1) status information, (2) intent information, and (3) sensor information to some or all of the other machines in the mesh network. In the example of system 100 shown in FIG. 100, machine 102*a* is shown as broadcasting information to each of machines 102*b*, 102*c*, and 102*d* in mesh network 104*a*; and machine 102*e* is shown as broadcasting information to machine 102*f* in mesh network 104*b*.

Turning now from machines 102*a*-102*f* in mesh networks 104*a* and 104*b*, attention is directed to remote consortium 106, which may comprise one or more consortium members 108*a*-108*f* As explained herein, remote consortium 106 may be an entity (or consortium of entities) located remotely from the mesh networks of the system and configured to receive verification data and agreement/transaction data, manage reliability metrics, and distribute reliability reports to machines in the mesh networks as necessary. While the examples discussed herein focus on a remote distributed consortium, some or all of the same functions could in some embodiments be performed by a single entity, rather than a consortium, acting as a reliability authority.

With regards to a distributed remote consortium, consortium members, such as consortium members 108*a*-108*f*, may in some embodiments be any entities configured to exchange information with vehicles in the system via cellular communication, or by other network communication protocols. For example, a consortium member may be any one or more processors or servers configured to send and receive information to and from machines in the system, to perform calculations in accordance with methods executed by the system (e.g., generating or modifying a map of an environment, resolving a transaction or exchange between machines in the system, calculating a reliability metric associated with machine in the system), and/or to store information about transactions and/or calculations performed by the system. In some examples, consortium members may be associated with vehicle manufacturers, insurance companies, banks, government organizations, law enforcement organizations, other corporations, and/or private individuals. By allowing multiple different parties with different affiliations to participate in a distributed consortium as consortium members, transparency of information received, sent, and stored by the consortium may be increased. The distributed nature of the consortium, including any one or more distributed ledgers maintained by the consortium, may increase transparency, security, efficiency, accessibility, and public trust in the consortium and the associated system.

In some embodiments, the electronic communication scheme and/or network used to send data between one or more of the consortium members and vehicles in the system may transmit data more slowly (e.g., rate of data per unit time) than the electronic communication scheme and/or network used to send information amongst machines in a mesh network. Thus, mesh networks in the system may facilitate fast vehicle-to-vehicle communications, while communication with a remote consortium may be slower by comparison.

In some embodiments, remote consortium 106 may be configured (1) to facilitate, execute, and/or store one or more records of agreements and/or transactions made between machines/vehicles in the system; and (2) to store, manage, and distribute information regarding reliability of machines/vehicles in the system. One or more of these functions may be executed via the use of one or more distributed ledgers stored and updated by a plurality of consortium members (e.g., members 108*a*-108*f*) of the consortium 106.

Regarding the first function, a remote consortium may be configured to receive information from one or more machines in the system regarding an agreement, interaction, and/or transaction between one or more machines in the system. For example, if two machines in the mesh network negotiate and agree upon a course of action (e.g., which vehicle will travel where and when), then information regarding the agreement may be transmitted by one or both machines to the remote consortium. Upon receiving the information regarding the agreement, interaction, and/or transaction, the remote consortium may store a record of the agreement as part of a distributed ledger. In some embodiments, a copy of the distributed ledger may be maintained by all of the consortium members in the remote consortium, and each of the members maintaining a copy of the distributed ledger may record the agreement as part of the distributed ledger.

In some embodiments, the information regarding the agreement, interaction, and/or transaction may include information regarding an amount of value and/or number of tokens (e.g., cryptocurrency) that may be transferred amongst two or more machines in connection with the agreed upon course of action. Thus, when an agreement or transaction between machines includes an agreement to exchange a token or other representation of value, a record of that part of the agreement may also be sent from one or more of the machines to the remote consortium, and that record may be recorded by one, some, or all of the consortium members as part of the distributed ledger maintained by the remote consortium.

In some embodiments, a distributed ledger or other record maintained by all or part of the remote consortium may constitute the official record of agreements made between machines in the system and/or value or tokens exchanged by machines in the system. Accordingly, recording a transaction in the distributed ledger may itself constitute a transfer of tokens and/or value. That is, the remote consortium may be the entity that actually executes the transaction, rather than the machines themselves.

In some embodiments, the information regarding the agreement, interaction, or transaction may be transmitted from the machines to the remote consortium via cellular communication, or by another suitable network communication scheme. In some embodiments, the information may be transmitted directly from a machine to one or more of the members of the remote consortium, and the receiving member may then transmit the information to one or more (or all) of the other members of the remote consortium, such that two or more (or all) of the members of the remote consortium may record the information in the distributed ledger.

In the example shown in system 100 in FIG. 1, machines 102*a* and 102*e* are transmitting transaction information to remote consortium 106. While not shown, other vehicles or machines that are party to the transactions may also transmit information about the transaction to remote consortium 106.

Regarding the second function of the remote consortium mentioned above, a remote consortium may be configured in some embodiments to distribute information regarding reliability of machines/vehicles in the system. Maintaining dynamic respective records of the reliability of each machine in the system may enable the system to create and/or update a collaboratively built map of the environment and to collaboratively plan for collective motion/action of the machines in the system while taking into account the known reliability (or unreliability), or the fact that reliability is unknown, of each machine in the system.

For example, autonomous vehicles may generally give other vehicles a wide berth and travel slowly while in the vicinity of other vehicles in order to minimize the risk of collision with the other vehicles. Particularly when an autonomous vehicle cannot accurately and reliably predict the course of action that another vehicle will take, giving a wide berth and traveling slowly may be the only effective mechanism to reduce the risk of collision. Even if the future action or expressed intent of other vehicles can be gleaned by the autonomous vehicle, the autonomous vehicle may still be unable to verify that the other vehicles will in fact comply with their expressed intent or with a predicted action; for example, other vehicles may have unknown aftermarket modifications to routing algorithms, may be commandeered by human drivers to take actions not in accordance with known routing algorithms, or may even be acting intentionally deceptively (e.g., in a military or combat environment where unknown vehicles may in fact be hostile). Thus, traveling slowly and giving a wide berth to other vehicles may be the only safe and effective way to reduce collision risk, which thereby increases travel time and decreases efficiency (e.g., vehicles per hour) of all travel in the system.

However, in accordance with the disclosure herein, travel time may be decreased and efficiency (e.g., vehicles per hour) may be increased by monitoring the reliability of machines and vehicles in the system, recording and updating records of this reliability, and using the recorded records in order to build maps of environments and to plan for collective action.

In some embodiments, reliability of machines and vehicles in the system may be monitored on an ongoing basis by other machines and vehicles in the system. In this way, machines and vehicles in the system may act as verifiers of the reliability of other machines and vehicles in the system. When acting as a verifier, a machine or vehicle in the system may compare an expressed characteristic and/or expressed intended action by another vehicle in its mesh network with the actual, observed characteristics or actions of the vehicle. For example, a vehicle in a mesh network may broadcast to other vehicles in the mesh network that it is traveling at 60 mph, but one or more other vehicles in the mesh network may observe via their native sensors that the vehicle is actually traveling at 65 mph. The one or more other vehicles may then transmit a verification report to the remote consortium indicating the inaccuracy of the broadcasted information. In other situations, where information broadcasted by a vehicle matches the information detected by the native sensors of other machines or vehicles in the system, then the other machines or vehicles may transmit a verification report to the remote consortium indicating the accuracy of the broadcasted information.

Verification reports may, in some embodiments, indicate the accuracy or inaccuracy of any information that is broadcasted by a vehicle or machine in the system. As explained above, information broadcasted between machines in a mesh network may include status information, intent information, and/or sensor information, including but not limited to:

information regarding immutable machine characteristics, such as vehicle type, vehicle size, vehicle affiliation, vehicle ownership, vehicle capabilities (e.g., acceleration, braking, speed, turning capabilities, etc.), vehicle software and hardware capabilities, sensor capabilities, etc.;

information regarding dynamic machine characteristics, such as current location, current velocity, current direction, current fuel supply, current battery status, etc.;

information regarding a machine's intent (e.g., its current plan and/or its intended or desired plan) regarding future conduct, including any intended navigational function such as acceleration, braking, turning, pausing, a desired roadway or pathway, and/or a desired destination or endpoint; and/or information regarding data detected by a machine's sensors (e.g., radar sensors, LIDAR sensors, computer vision sensors), including detected environmental characteristics, detected foreign object characteristics, and detected characteristics of other machines in the network.

In any instance in which information broadcast by one machine in a mesh network can be compared to information detected by one or more sensors of another machine in the network, a verification report regarding the perceived accuracy or inaccuracy of the broadcasted information may be generated by any observing machine and transmitted to the remote consortium. For example, an observing machine may compare broadcasted size to observed size, broadcasted position/location to observed position/location, broadcasted velocity to observed velocity, broadcasted intent regarding a future route or path or action to actual observed route or path or action, broadcasted information regarding environmental topography or characteristics to observed environmental topography or characteristics, and/or broadcasted information regarding foreign object characteristics to observed foreign object characteristics.

Upon receipt of a verification report by the remote consortium, the remote consortium may use the verification report to generate or modify a recorded reliability metric associated with the vehicle or machine that is the subject of the verification report. In some embodiments, reliability metrics may be stored in one or more centralized databases, and/or they may be recorded as a part of one or more distributed ledgers. In some embodiments, reliability information including reliability metrics may be recorded in the same distributed ledger as discussed above with respect to recording agreements/transactions between machines, while in some embodiments, reliability information including reliability metrics may be recorded in a different distributed ledger. In some embodiments, reliability information and/or transaction information for a plurality of vehicles in the system (e.g., for all vehicles in a mesh network or for all vehicles in the entire system) may be maintained as part of a single distributed ledger; in some alternate embodiments, reliability information and/or transaction information may be maintained in a plurality of vehicle-specific, machine-specific, vehicle-type- or machine-type-specific, and/or location-specific distributed ledgers.

In some embodiments, a reliability metric may be stored as a vector, wherein vector components of the vector each correspond to the observed and calculated reliability of a different aspect of the subject vehicle. For example, one vector component may indicate the reliability of a vehicle's measurement of its own speed, another vector component may indicate the reliability of a vehicle's measurement of other vehicle's speeds, another vector component may indicate the reliability of a vehicle's detection of foreign object location, and another vector component may indicate the reliability of a vehicle's compliance with agreed-upon and/or broadcasted future courses of action. In some embodiments, one or more vector components may indicate the accuracy or inaccuracy (e.g., reliability or unreliability) of one or more characteristics of a machine's verification reports themselves. For example, if a machine has historically sent inaccurate verification information, then an indication of the lack of reliability of the verification information may be recorded in a component of the reliability vector.

Note that, in some embodiments, verification information regarding the accuracy or inaccuracy of broadcasted information may be calculated by machines in mesh networks of the system and transmitted to the remote consortium to be recorded in a reliability metric of the observed machine. However, in some embodiments, machines in the mesh networks may not actually calculate reliability information or compare broadcasted information to observed information themselves; instead, the machines may simply send observed information, and comparisons of agreement or discrepancies between information about the same characteristic observed and/or broadcasted by two different machines may be calculated by one or more members of the remote consortium. That is, in some embodiments, comparison of disparate information detected by two different machines in the system may be carried out by the remote consortium, rather than by either of the vehicles themselves. Regardless of how or where the comparison of detected and/or broadcasted information is carried out, metrics (e.g., vectors) regarding the reliability or unreliability of one or more characteristics of a machine may nonetheless be recorded by the remote consortium.

In the example of system 100 shown in FIG. 1, machine 102b is transmitting a verification report (e.g., verification information) to remote consortium 106. The verification report may indicate an observed accuracy or inaccuracy of the information broadcasted via the mesh network from vehicle 102a to vehicle 102b. Similarly, machine 102f is transmitting a verification report (e.g., verification information) to remote consortium 106. The verification report may indicate an observed accuracy or inaccuracy of the information broadcasted via the mesh network from vehicle 102e to vehicle 102f.

Following the transmission of verification information from machines in the system and the recording of reliability metrics by the remote consortium, the recorded reliability metrics may be relied on by one or more machines in the system as a part of their collaborative map building and route/path planning. Namely, when collectively building a shared map of an environment associated with a mesh network of machines, the machines in the mesh network may use reliability metrics associated with other machines in the network to weight information gleaned from those machines.

For example, if a machine is known to be highly reliable based on a large number of observations and behaviors in the past that have been verified by other machines as accurate, then information attributable to that machine may be relied on by the system with a high degree of confidence. Thus, if the known-reliable machine indicates that it observes a foreign object at a certain location traveling at a certain velocity, then the foreign object may be inserted into the shared map with a high associated degree of confidence. Furthermore, if the known-reliable machine indicates that it intends to travel in a certain direction at a certain speed, then its path of travel may be inserted into the shared map with a high degree of confidence.

On the other hand, if a machine is known by the system to be unreliable based on observations and behaviors in the past that were verified as inaccurate, or if a machine is new to the system and is not known to be reliable or unreliable, then information attributable to that machine may be relied on by the system with a medium or low degree of confidence. Thus, if the known-unreliable or unknown-reliability machine indicates that it observes a foreign object at a certain location traveling at a certain velocity, then the foreign object may be inserted into the shared map with a low or medium associated degree of confidence, respectively. Furthermore, if the known-unreliable or unknown-reliability machine indicates that it intends to travel in a certain direction at a certain speed, then its path of travel may be inserted into the shared map with a low or medium associated degree of confidence, respectively.

A map of an environment in a system such as the one discussed herein may, in some embodiments, be referred to as a shared uncertainty map or as a shared uncertainty contour map. In some embodiments, the map may be a dynamic map of two-dimensional or three-dimensional space representing a window of time, and which may be used for planning actions by connected vehicles over a planning horizon H, which may be a period of time that may be a whole multiple of the window of time represented by the map. In one embodiment, the interval of time represented by the map may be 1 second, while the planning horizon may be 8-15 seconds.

In some embodiments, the map may divide the environment into regions (e.g., a two-dimensional or three-dimensional grid of regions) and may associate each region with a respective indication of a likelihood that an object will be present in the region at a given period in time. The likelihood may be expressed, in some embodiments, as a percentage between 0% and 100%. The likelihood may be expressed, in some embodiments, as a numerical score within a predefined range; for example, a score may range between −100 to +100, with a score of −100 representing a 100% estimated chance of no object being present in the region, a score of +100 indicating a 100% estimated chance of an object being present in the region, and a score of 0 indicating a 50% estimated chance of an object being present in the region and/or no information about the estimated chance of collision. In some embodiments, the regions of the map may represent any suitable amount of space, such as a square region 1 cm by 1 cm in size, 10 cm by 10 cm in size, or 1 m by 1 m in size, or such as a such as a cubic region 1 $cm^3$ in size, 10 $cm^3$ in size, or 1 $m^3$ in size.

In some embodiments, the map as a whole may correspond to a given window of time, such as a 1-second time window, a 4-second window, a 5-second time window, a 10-second window, a 15-second window, a 30-second time window, or a 1-minute window. In some embodiments, a new map may be generated to replace an expired map in accordance with the expiration of a time-period that the expired map represented. In some embodiments, the time window represented by the map may be dynamically determined; in some embodiments, a dynamically-determined amount of time may be based on one or more characteristics of one or more objects and/or vehicles in the map, such as vehicle speed, vehicle proximity, and/or intended vehicle paths. For example, maps having shorter time windows may be generated when mapped vehicles are in closer proximity to one another, or when mapped vehicles intend to perform more maneuvers (e.g., more intricate maneuvers) in closer proximity to one another; whereas maps having longer time windows may be generated when mapped vehicles are further apart from one another, are moving faster, and/or intend to cover longer distances over longer amounts of time before needing to negotiate/plan more intricate maneuvers for when the vehicles are in closer proximity to one another.

For example, a roadside guard rail that has been present for many years and been detected and verified by hundreds or thousands of machines may be reflected in the shared map by an indication of near-100% confidence that the area where the guard rail is located is, in fact, occupied by the guard rail. Similarly, a vehicle that has been participating in the system for a long period of time and has demonstrated, over hundreds or thousands of past actions compliant with broadcasted intentions, that its broadcasted intentions are reliable, may be reflected in the shared map by an indication of high (e.g., 95% or greater) confidence that the vehicle is in fact where it indicates it is (and that it will soon be where it indicates that it will soon be).

On the other hand, if a vehicle is a new participant in the system whose reliability is not yet established, then the likelihood of its presence at its broadcasted location may be indicated in the map as lower (e.g., 70%, 60%, etc.), and its likelihood of presence at surrounding nearly locations may be indicated in the map as non-negligible (e.g., 10%, 20%, etc.). Furthermore, if a machine, object, or vehicle is not connected to the system at all, then its location and potential future locations may be reflected in the map with lower confidence levels. In some embodiments, a location of a non-connected vehicle may be known with moderate or high confidence only to the extent that one or more connected vehicles can determine its present location with moderate or high confidence. However, the future location of a non-connected vehicle may not be known with a high degree of confidence by the system, and may be predicted by the system to be a broad swath of potential locations surrounding the vehicle, as the system may not know whether the non-connected vehicle will continue straight, turn in either direction, accelerate, slow, or stop; thus, the non-connected object may be reflected in the map as an area of high uncertainty and increased risk of collision (e.g., 20%, 50%, 80%, etc.) in a wider area surrounding the non-connected vehicle.

By assigning all of the regions in the map to an associated likelihood that an object is or will be present in the region, a two-dimensional (or three-dimensional) map of the uncertainty and risk of traveling in each region of the environment may be created. In some embodiments, the map created may define contours of increasing and decreasing uncertainty and risk, where known-present high-confidence objects may be reflected as geographically-narrow, well-defined spikes in risk, whereas suspected-present lower-confidence objects may be reflected as physically-wider, less-well-defined increases in risk.

When features of the shared map are defined with a high degree of confidence, then machines in the environment may be able to travel at higher speeds and closer distances to the well-defined features, without unduly or unacceptable increasing the risk of collision. On the other hand, when features of a shared map of an environment are defined with a medium or low degree of confidence, then machines in the environment may travel at lower speeds and/or greater distances from the less-well-defined features, so as to ensure that risk of collision stays below a predefined acceptable threshold risk level. Thus, as machines in systems such as system 100 are verified over time as reliable based on past accurate observations and past compliant behavior, dynamic shared environmental maps may increase in accuracy and their features may become more narrowly and accurately and precisely defined. As the dynamic shared environmental maps are improved, travel speeds of machines in the system may be increased and the distances by which machines in the system must be separated from one another and from environmental features may be reduced. Accordingly, overall efficiency of routes and/or motion paths may be increased, and overall efficiency of transportation systems (e.g., vehicles per hour) may be increased. These improvements may be achieved, as explained herein, without increasing the risk of collisions in the system above a predefined acceptable threshold risk level.

In some embodiments, a shared uncertainty map in a system such as the ones described herein may be generated and discarded once per predefined interval, and/or once per dynamically and/or systematically defined interval. In some such embodiments, one or more new mesh networks may be established, information may be broadcasted and processed, reliability information may be requested and received, and a new shared uncertainty map (which may, in some embodiments, be based on a static baseline and/or low resolution geographical map) may be generated for each interval. For example, in some embodiments, where collaborative motion planning is performed iteratively by a system once every 4-10 seconds, a new map may be built for each 4-10 second interval. In some embodiments, alternately or additionally, a shared uncertainty map may persist for more than one interval and may be updated by the mesh network of vehicles that created it, and/or may be updated by other machines in the system that did not originally contribute to its creation. Updates to a preexisting shared uncertainty map may refine the accuracy of the map and may also reflect changes in the environment, such as object that have moved since a previous iteration.

Thus, in accordance with the principles explained above, one or more machines in the system, such as system 100, may use reliability metrics to negotiate agreements and/or transactions with other machines in the system, and/or to contribute to building or modifying a shared uncertainty map of an environment. In some embodiments, any machine in the system may query the remote consortium for a desired reliability report, and the remote consortium may respond to the query by delivering the requested reliability report.

In the example of system 100 in FIG. 1, machine 102a is shown as querying remote consortium 106 for a first reliability report (e.g., a report concerning the reliability of one of the other machines in mesh network 104a), and remote consortium 106 is shown as responding to the query by delivering the requested reliability report to machine 102a. Similarly, machine 102e is shown as querying remote consortium 106 for a first reliability report (e.g., a report concerning the reliability of one of the other machines in mesh network 104b), and remote consortium 106 is shown as responding to the query by delivering the requested reliability report to machine 102e.

It should be noted that, in some embodiments, reliability metrics may be stored, in whole or in part, by machines themselves, such that a vehicle could carry with it a report regarding its own reliability scores. In some such embodiments, accessing the reliability report for sharing it with other machines in the mesh network may be faster. However, in some embodiments, storing reliability reports remotely and/or in a distributed fashion, such as storing them on via the remote consortium, may increase transparency and reliability in the accuracy of the report itself, because remotely-stored and or distributive information may be less likely to be compromised and/or intentionally falsified.

In some embodiments, components of a system such as system 100 may transmit additional information, not specifically discussed above (or elsewhere herein) between one another and/or to components outside the system. As just one example, system components may perform additional transmissions of data regarding tokens or other representations of value or associated with the right to occupy space in time. For example, in some embodiments, data regarding tokens or representations of the like may be transmitted to or from vehicles or machines in the system by authorized third parties, or it may be transmitted amongst components of the system in accordance with criteria besides the transactions discussed above. In some embodiments, machines in the system may receive tokens and/or representations of the like in exchange for contributing to uncertainty reduction, contributing to alleviating computational burden, and/or contributing to operations regarding data storage and/or maintenance of one or more distributed ledgers. For example, in some embodiments, a machine in the system (e.g., one of machines 102a-102f) may earn tokens or representations of the like discussed above in exchange for performing one or more actions associated with the system, such as by sending, receiving, or processing data. For example, one or more system components may earn said tokens or representations in exchange for spending time connected to the system, for sending sensor data to the system, for passing information from one component in the system to another, for verifying broadcasted data from machines in the system, for performing calculations used to generate a collective map of the environment, and/or for performing calculations used to generate a collective routing plan in the system. In some embodiments, machines in the system may earn said tokens or representations in exchange for complying with a collective routing plan and/or for complying with a broadcasted intention of the machine; conversely, machines in the system may be docked said tokens or representations for failing to comply with a plan or with a broadcasted intention.

Figure 2:
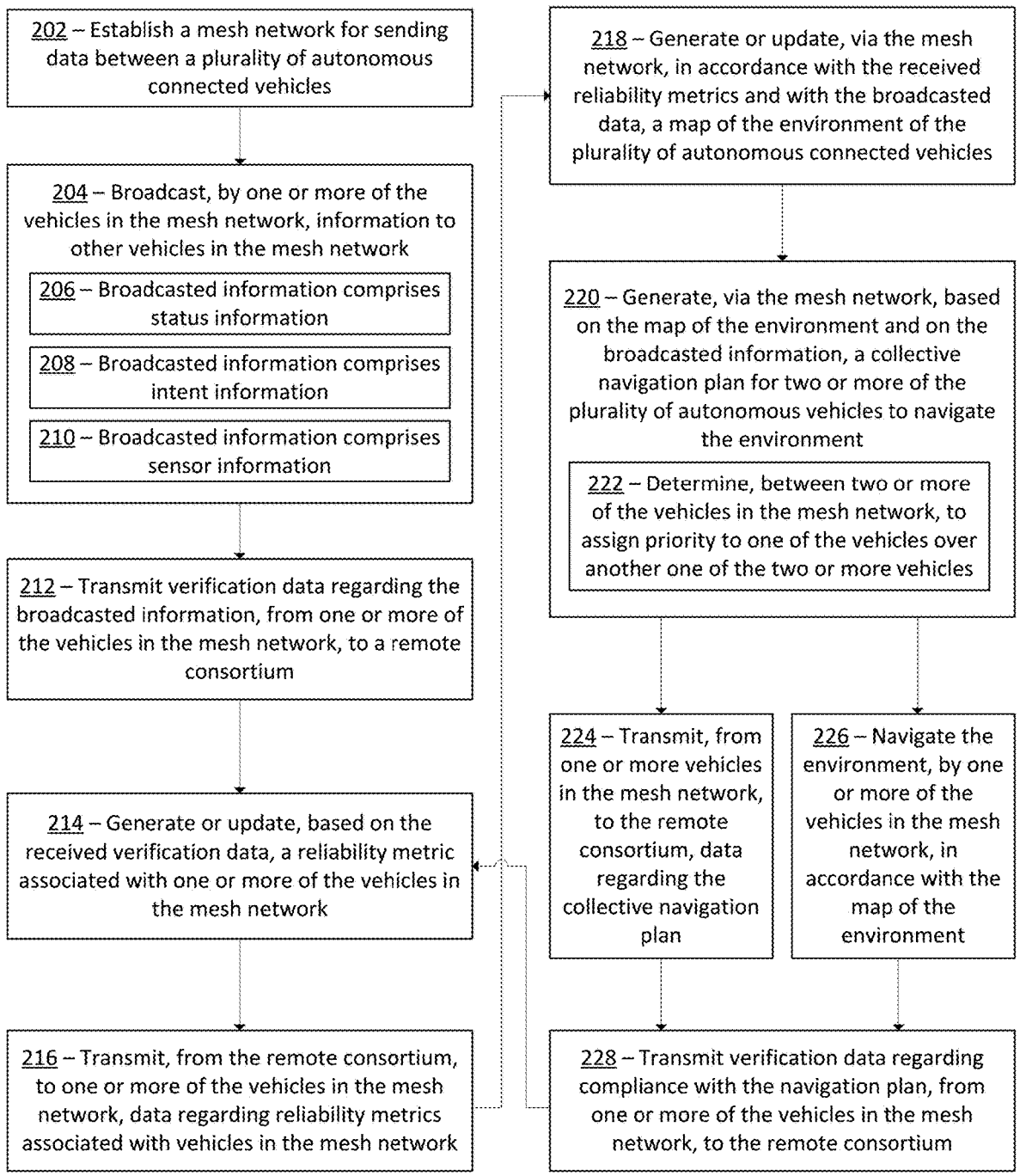
FIG. 2 depicts a flowchart representing an exemplary method for optimizing cooperative actions among heterogeneous autonomous connected vehicles, in accordance with some embodiments.

FIG. 2 depicts a flowchart representing an exemplary method 200 for optimizing cooperative actions among heterogeneous autonomous connected vehicles, in accordance with some embodiments. In some embodiments, method 200 may be carried out, in whole or in part, by one or more of the components of a system for optimizing cooperative actions among heterogeneous autonomous connected vehicles, such as system 100 described above with respect to FIG. 1. In some embodiments, any one or more of the aspects of method 200 may be combined, in whole or in part, with any one or more of the aspects of FIG. 1, and/or with any one or more of the systems, methods, devices, and/or techniques described elsewhere herein.

At block 202, in some embodiments, the system may establish a mesh network for sending data between a plurality of autonomous connected vehicles. One or more of the plurality of autonomous connected vehicles may share one or more characteristics in common with machines 102a-102f and other autonomous connected vehicles and machines as discussed above with respect to system 100 and FIG. 1. Method 200 may be equally applicable, in some embodiments, to autonomous machines that may include, but are not limited to, autonomous vehicles. Similarly, the mesh network established may share one or more characteristics in common with mesh networks 104a and 104b and other mesh networks as discussed above with respect to system 100 and FIG. 1.

As discussed above, the plurality of autonomous connected vehicles may be heterogeneous, and the mesh network may in some embodiments be established via a communication scheme (e.g., medium, protocol, one or more networks, etc.) allowing the vehicles (and/or machines) to communicate directly with one another, rather than communicating via cellular and/or satellite communication.

Establishing a mesh network may in some embodiments comprise selecting a subset of a larger group of autonomous vehicles for inclusion in the mesh network. In some embodiments, vehicles participating in the mesh network may be those inside a two-dimensional or three-dimensional proximity boundary defining an environment in which the vehicles may travel. The proximity boundary may, in some embodiments, be defined in part by considerations regarding the communication capabilities (e.g., ranges) of one of more of the autonomous vehicles; considerations regarding the sensor capabilities (e.g., ranges) of one of more of the autonomous vehicles; environmental characteristics (e.g., characteristics of the topography and/or the roadways surrounding the vehicles); and/or logical considerations regarding the speed, direction, and nature of travel of the plurality of vehicles. In some embodiments, one or more vehicles may dynamically leave and/or join the mesh network, such as when a vehicle leaves or enters the proximity boundary, following establishment of the mesh network.

At block 204, in some embodiments, one or more of the vehicles in the established mesh network may broadcast information, via the mesh network, to other vehicles in the mesh network. In some embodiments, the broadcast of information may be to some but not all of the other vehicles in the network, while in some embodiments the broadcast may be to all of the other vehicles in the network. In some embodiments, the broadcast of information may be direct or indirect.

As shown at blocks 206, 208, and 210, the information broadcasted may include status information about the broadcasting vehicle, intent information about the broadcasting vehicle, and/or sensor information about the broadcasting vehicle. Each of the status information, intent information, and sensor information may share any one or more characteristics in common with the status information, intent information, and sensor information, respectively, discussed above with respect to system 100 and FIG. 1.

At block 212, in some embodiments, one or more of the vehicles in the established mesh network may transmit verification data regarding the broadcasted information to a remote consortium. The remote consortium may share one or more characteristics in common with remote consortium 106 and other mesh remote consortiums as discussed above with respect to system 100 and FIG. 1. As discussed above, the remote consortium may in some embodiments be comprised of a plurality of disparate (and potentially unaffiliated) entities each maintaining one or more servers contributing to the remote consortium. As discussed above, some or all information stored, maintained, retrieved, and/or distributed by the remote consortium may be stored as part of one or more distributed ledgers, which may increase transparency and security of the remote consortium.

The verification data regarding the broadcasted information, transmitted to the remote consortium, may comprise one or more comparisons of the broadcasted information made by another vehicle in the same mesh network as the broadcasting vehicle. In some embodiments, rather than a comparison of the broadcasted information made by another vehicle in the mesh network, the verification data may merely comprise data detected by another vehicle in the mesh network that bears on the same underlying information (e.g., the same detected object, the same detected speed) as the broadcasted information; in some such embodiments, a comparison of the two data points regarding the same information may be made by the remote consortium, rather than by the vehicle transmitting the verification data.

At block 214, in some embodiments, the remote consortium may generate or update, based on the received verification data, a reliability metric associated with one of the vehicles in the mesh network. For example, when verification data is sent regarding information broadcasted by a first vehicle, then the remote consortium may update a reliability metric associated with the first (broadcasting) vehicle. In some embodiments, the remote consortium may alternately or additionally update a reliability metric associated with the vehicle that sent the verification data, for example in an instance in which the remote consortium determines that the verification data itself is inaccurate.

The reliability metric may share one or more characteristics in common with reliability metrics as discussed above with respect to system 100 and FIG. 1. For example, the reliability metric may be stored in the form of a vector, where individual vector components associated respectively with the accuracy and reliability of the associated vehicle in measuring a particular kind of respective data (e.g., measuring a vehicle's own speed, measuring another vehicle's speed, measuring a distance to a detected object, etc.).

As discussed above, the reliability metric may also indicate information regarding a vehicle's reliability in faithfully complying with an expressed intent, such as an intent negotiated as part of a collective navigation plan (as discussed above and further discussed below). In some embodiments, a vehicle's likelihood to comply with an expressed intent may be expressed as one or more vector components in a vector constituting, in whole or in part, the reliability metric for the vehicle.

In some embodiments, the reliability metric may be generated and/or weighted in accordance with an indication of the system's confidence in a vehicle's identity. For example, a high confidence in vehicle identity may allow the system to assign full weight to the vehicles reliability as established by past readings and actions, whereas a lower confidence in a vehicle's identity may cause the system to assign less than full weight to the vehicle's alleged past readings and actions. Considering confidence in vehicle identity in determining and/or weighting reliability metrics may make the system more resilient to malicious or deceptive actors, such as vehicles attempting to spoof or otherwise fake identity or credentials.

At block 216, in some embodiments, the remote consortium may transmit, to one or more of the vehicles in the mesh network, data reliability metrics associated with one or more vehicles in the mesh network. As discussed above, vehicles in the system may in some embodiments transmit a query to the remote consortium requesting a reliability report comprising a reliability metric associated with one or more other vehicles in the mesh network. For example, a vehicle may request a reliability report on another vehicle in its immediate vicinity, or on a vehicle with which it is attempting to negotiate priority for a position in the environment that both vehicles intend to occupy at the same time. As described above, the remote consortium may respond to receipt of such requests by distributing the requested reliability report and/or reliability metric to the requesting vehicle. In some embodiments, one of the vehicles from among the group of vehicles constituting the mesh network may submit a request for relevant reliability reports on behalf of one or more other vehicles in the mesh network. This approach may reduce redundancy by eliminating the need for each vehicle to submit individual requests. In some embodiments, this request may be transmitted in response to the mesh network of vehicles being formed (e.g., when the local proximity network of vehicles is formed).

In some embodiments, rather than or in addition distributing reliability information upon request, the remote consortium may distribute reliability information at predefined intervals. In some embodiments, rather than or in addition to distributing reliability information to vehicles about other vehicles in the mesh network, the remote consortium may distribute to one or more vehicles its own reliability metric, for example so that the vehicle itself can maintain, store, and/or distribute information about its own reliability.

At block 218, in some embodiments, one or more of the vehicles in the mesh network may generate or update, in accordance with the received reliability metrics and with the broadcasted data, a map of the environment of the plurality of autonomous connected vehicles. The generated (and/or updated) map may share one or more characteristics in common with maps as discussed above with respect to system 100 and FIG. 1, including that it may be collaboratively generated and may account for reliability information associated with one or more vehicles and/or machines of the system in order to assign a risk/uncertainty to a given region of the map.

In some embodiments, in addition to being configured to be relied upon by vehicles in the system to generate a collective navigation plan (as discussed elsewhere herein), the map may further be configured to be displayed on a display to a user of the system (e.g., a passenger in one of the automated vehicles, a system engineer, a city planning official, an emergency responder, etc.).

At block 220, in some embodiments, one or more of the vehicles in the mesh network may generate, based on the map of the environment and on the broadcasted information, a collective plan for two or more of the plurality of autonomous vehicles to navigate the environment. That is, a plan for at least two vehicles to navigate the environment (e.g., by accelerating, braking, turning, etc.) may be generated in accordance with the shared map, the broadcasted status information, the broadcasted intent information, and/or the broadcasted sensor information. The navigational plan may, in some embodiments, be generated in accordance with any one or more algorithms and requirements for vehicle navigation, and may in some embodiments rely on a shared uncertainty map (e.g., the collectively generated map) in order to ensure that the navigation plan does not create a risk of collision that exceeds a predefined maximum acceptable risk level.

At block 222, in some embodiments, generating the navigation plan may comprise determining, between two or more of the vehicles in the mesh network, to assign priority to one of the vehicles of over the another one of the two or more vehicles. This determination may, in some embodiments, share one or more characteristics in common with the negotiations and/or agreements made between two vehicles as discussed above with respect to system 100 in FIG. 1.

As discussed above, a determination (e.g., negotiation, agreement, transaction, etc.) between two vehicles may in some embodiments comprise agreeing to assign priority to one vehicle to occupy a space in the environment in time. For example, one vehicle may be allowed to turn onto a link or roadway before another vehicle is allowed to turn onto the same link of roadway. Furthermore, as discussed above, a determination (e.g., negotiation, agreement, transaction, etc.) between two vehicles may in some embodiments comprise agreeing to exchange a token, other representation of the right to occupy a space in time, or other representation of value in accordance with the determination.

In some embodiments, generating a collective navigation plan for a mesh network may comprise negotiating dozens or hundreds of individual determinations between different pairs or groups of vehicles in the mesh network. Each of these determinations may be accounted for in the collective navigation plan that may provide a framework by which all vehicles in the mesh network may safely and efficiently navigate the environment with the greatest speed and efficiency attainable without unduly (e.g., beyond a predetermined maximum threshold value) increasing the risk of collision.

At block 224, which may follow from blocks 220-222 and be executed in parallel to block 226, in some embodiments, data regarding the collective navigation plan may be transmitted from one or more vehicles in the mesh network to the remote consortium. In some embodiments, for example as discussed above with respect to system 100 in FIG. 1, the transmitted data may reflect one or more determinations (e.g., negotiations, agreements, transactions, etc.) made between pairs or groups of vehicles that contribute to the overall collective navigation plan. In some embodiments, information regarding the exchange of tokens or other representations of rights or value may also be transmitted to the remote consortium as part of the data regarding the collective navigation plan.

As discussed above with respect to FIG. 1, data transmitted from the one or more vehicles regarding navigation determinations (e.g., negotiations, agreements, transactions, etc.), including information about the exchange of tokens or other representations of rights or value, may be stored by the remote consortium. In some embodiments, as discussed above, the data may be stored as part of one or more distributed ledgers, which may increase transparency and security of the information maintained by the remote consortium. By storing information regarding determinations, agreements, and/or transactions amongst vehicles in the system, the remote consortium may be consulted at a later time to determine reliability of vehicles in complying with agreed-upon actions. Furthermore, by storing information regarding determinations, agreements, and/or transactions amongst vehicles in the system, the remote consortium may be consulted at a later time to calculate and execute any necessary refunds or reversals of the exchange of tokens or the like in the event that one or more vehicles fails to comply with an agreed-upon navigation plan.

At block 226, which may follow from blocks 220-222 and be executed in parallel to block 224, in some embodiments, following generation of the collective navigation plan, one or more of the vehicles in the system may navigate the environment in accordance with the collective navigation plan. That is, the vehicles (or machines) may accelerate, brake, turn, or execute any other action or functionality in accordance with the collectively agreed-upon action.

At block 228, in some embodiments, following one or both of blocks 224 and 226, one or more vehicles in the mesh network may transmit, to the remote consortium, verification data regarding compliance with the navigation plan. This transmitting of verification data may, in some embodiments, share one or more characteristics in common with the transmission of verification data regarding compliance with a navigational plan, and/or in compliance with expressed/broadcasted intended actions, as discussed above with respect to system 100 in FIG. 1. In some embodiments, the transmission of verification data at block 228 may be similar to the transmission of verification data at block 212, except that the verification data at block 228 may concern whether or not a subject vehicle is complying with a navigational plan (and/or with its broadcasted intended actions) rather than concerning the accuracy of a subject vehicle's broadcasted status information or sensor information.

In some embodiments, the verification data broadcasted at block 228 may be gleaned from a comparison of (a) broadcasted intent information and/or a navigation plan to (b) a subject vehicle's observed actions as detected by one or more of a verifier vehicle's sensors. In some embodiments, the transmitted verification data may comprise an indication of whether or not the vehicle's observed behavior is in compliance with its prescribed behavior; in some embodiments, alternately or additionally, the transmitted verification data may comprise information regarding the subject vehicle's behavior itself, and a comparison of the observed behavior to the subject vehicle's prescribed behavior may be made by the remote consortium rather than by the verifying vehicle.

As shown in FIG. 2, following block 228, method 200 may revert/iterate to block 214, where one or more reliability metrics may be updated by the remote consortium in accordance with the verification data regarding the subject vehicle's compliance with the navigation plan. For example, a reliability metric of the subject vehicle (specifically, a vector component regarding fidelity to navigation plans) may be updated to indicate a poor reliability if the subject vehicle fails to comply with a navigation plan. Alternately or additionally, if the remote consortium determines that the verification data itself is unreliable, incorrect, or otherwise of poor quality, then a reliability metric of the verifying vehicle (specifically, a vector component regarding reliability of verification information) may be updated to indicate a poor reliability.

Alternately or additionally to reverting to block 214 from block 228, method 200 may revert/iterate to any earlier step in method 200. For example, a new or updated mesh network may be established; new or updated information may be broadcasted via the mesh network; new or updated verification information may be transmitted to the remote consortium; new or updated reliability metrics may be stored by the remote consortium; new or updated reliability metrics may be transmitted from the remote consortium to the mesh network; a map of the environment may be updated or generated anew; a collective navigation plan may be updated or generated anew; new or updated data regarding the collective navigation plan may be transmitted to the remote consortium; and/or new or updated navigational actions may be executed by one or more vehicles. In some embodiments, a system may be configured to execute all or part of method 200 in order to iterate a process (e.g., to generate a new collective map) once per predefined period of time, such as once every one second, once every 4 seconds, once every 5 seconds, once every 10 seconds, or once every 15 seconds.

While the examples discussed herein have contemplated connected vehicles with independent intent (e.g., independently intended routes, destinations, and/or tasks) using the systems discussed herein to plan collective action to optimize the efficiency with which the vehicles may each achieve their independent intent, the systems disclosed herein may also be used for exchange of information and collective planning of actions among groups of vehicles that include teams of vehicles. A team of vehicles may be any group of vehicles that do not have wholly independent intended routes, destinations, and/or tasks, even before leveraging the collective planning systems disclosed herein.

For example, a team of vehicles may intend to travel in a caravan, platoon, procession, or motorcade; or a team of vehicles may involve one or more primary vehicles and one or more support vehicles (e.g., scouting vehicles or guarding vehicles) that intend to travel in the vicinity of the primary vehicle(s) in a predetermined manner. In some embodiments, vehicle teams may exchange information (e.g., information regarding detected objects and/or intended action) with one another, in whole or in part, by using the systems disclosed herein, such as by weighting the reliability of information exchanged amongst team-member vehicles in accordance with the reliability metrics disclosed herein. In some embodiments, one vehicle in a team of vehicles may broadcast information (e.g., information regarding detected objects and/or intended action) regarding other vehicles on its team to one or more other vehicles using a system such as the one described herein.

Figure 3:
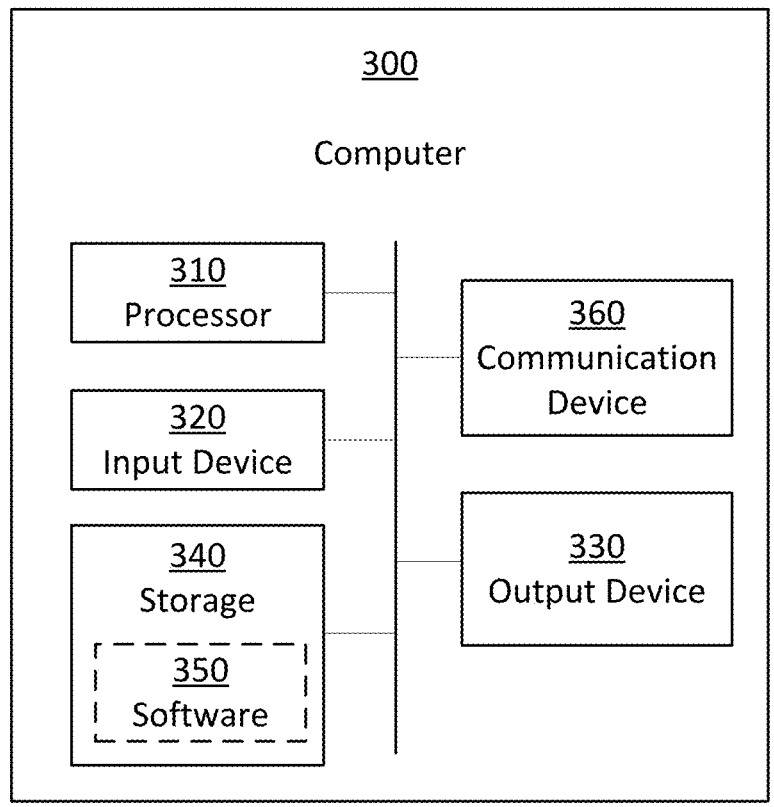
FIG. 3 depicts a computer, in accordance with some embodiments.

FIG. 3 illustrates a computer, in accordance with some embodiments. Computer 300 can be a component of a system for optimizing cooperative actions among heterogeneous autonomous connected machines, such as system 100 and/or any of its subcomponents described above with respect to FIG. 1. In some embodiments, computer 300 may be configured to execute a method for optimizing cooperative actions among heterogeneous autonomous connected machines, such as all or part of method 200 described above with respect to FIG. 2.

Computer 300 can be a host computer connected to a network. Computer 300 can be a client computer or a server. As shown in FIG. 3, computer 300 can be any suitable type of microprocessor-based device, such as a personal computer; workstation; server; or handheld computing device, such as a phone or tablet. The computer can include, for example, one or more of processor 310, input device 320, output device 330, storage 340, and communication device 360.

Input device 320 can be any suitable device that provides input, such as a touch screen or monitor, keyboard, mouse, or voice-recognition device. Output device 330 can be any suitable device that provides output, such as a touch screen, monitor, printer, disk drive, or speaker.

Storage 340 can be any suitable device that provides storage, such as an electrical, magnetic, or optical memory, including a RAM, cache, hard drive, CD-ROM drive, tape drive, or removable storage disk. Communication device 360 can include any suitable device capable of transmitting and receiving signals over a network, such as a network interface chip or card. The components of the computer can be connected in any suitable manner, such as via a physical bus or wirelessly. Storage 340 can be a non-transitory computer-readable storage medium comprising one or more programs, which, when executed by one or more processors, such as processor 310, cause the one or more processors to execute methods described herein, such as all or part of method 200 described above with respect to FIG. 2.

Software 350, which can be stored in storage 340 and executed by processor 310, can include, for example, the programming that embodies the functionality of the present disclosure (e.g., as embodied in the systems, computers, servers, and/or devices as described above). In some embodiments, software 350 can be implemented and executed on a combination of servers such as application servers and database servers.

Software 350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for optimizing cooperative actions among autonomous connected vehicles, comprising:
 a plurality of autonomous connected vehicles, each of the plurality of vehicles comprising one or more processors configured to control navigation of the respective vehicle in an environment surrounding the plurality of autonomous connected vehicles; and
 a remote consortium comprising a plurality of processors configured to send and receive data, via a first electronic communication network, to and from one or more of the plurality of autonomous connected vehicles;

wherein the plurality of autonomous connected vehicles is configured to:

establish a mesh network comprising the plurality of autonomous connected vehicles;

receive, from the remote consortium, via the first electronic communication network, data regarding a plurality of reliability metrics associated with the plurality of autonomous vehicles in the mesh network;

collectively generate and store, via the mesh network, a map of the environment surrounding the plurality of autonomous connected vehicles, wherein the map is generated in accordance with one or more of the plurality of reliability metrics received from the remote consortium; and collectively generate and store, via the mesh network, based on the map of the environment, a collective navigation plan for the plurality of autonomous connected vehicles to navigate the environment.

2. The system of claim 1, wherein a first autonomous vehicle of the plurality of autonomous connected vehicles is configured to broadcast, to a second one of the plurality of autonomous connected vehicles, via the mesh network, information regarding a current status of the first vehicle.

3. The system of claim 2, wherein the second autonomous vehicle is configured to transmit, to the remote consortium, verification data based on a comparison of the broadcasted information regarding a current status of the first vehicle to information regarding the current status of the first vehicle detected by one or more sensors of the second vehicle;

wherein the verification data is used by the remote consortium to generate or modify one or more of the plurality of reliability metrics.

4. The system of claim 1, wherein a first autonomous vehicle of the plurality of autonomous connected vehicles is configured to broadcast, from a first one to a second one of the plurality of autonomous connected vehicles, via the mesh network, information detected by one or more sensors of the first vehicle.

5. The system of claim 4, wherein the second autonomous vehicle is configured to transmit, to the remote consortium, verification data based on a comparison of the broadcasted information detected by one or more sensors of the first vehicle to information detected by one or more sensors of the second vehicle;

wherein the verification data is used by the remote consortium to generate or modify one or more of the plurality of reliability metrics.

6. The system of claim 1, wherein a first autonomous vehicle of the plurality of autonomous connected vehicles is configured to broadcast, from a first one to a second one of the plurality of autonomous connected vehicles, via the mesh network, information regarding an intended navigation action of the first vehicle.

7. The system of claim 6, wherein the second autonomous vehicle is configured to transmit, to the remote consortium, verification data based on a comparison of the broadcasted information regarding the intended navigation action of the first vehicle to information regarding an observed navigation action of the first vehicle detected by one or more sensors of the second vehicle;

wherein the verification data is used by the remote consortium to generate or modify one or more of the plurality of reliability metrics.

8. The system of claim 1, wherein generating the map of the environment comprises associating a region of the environment with a calculated probability that an object will be present in the region during a given period in time.

9. The system of claim 8, wherein the probability that an object will be present in the region during the given period in time is calculated in accordance with a reliability metric of a vehicle of the plurality of vehicles that indicated that the object will be present at the given during the given period in time.

10. The system of claim 1, wherein generating the collective navigation plan comprises assigning priority to occupy a location in the environment to a selected vehicle of the plurality of autonomous connected vehicles to the exclusion of a non-selected vehicle of the plurality of autonomous connected vehicles.

11. The system of claim 10, wherein generating the collective navigation plan comprises determining a number of tokens to transfer from the selected vehicle to the non-selected vehicle.

12. The system of claim 11, wherein determining the number of tokens to transfer comprises:

generating, by each of the selected vehicle and the non-selected vehicle, a respective sealed bid of a respective number of tokens;

identifying the selected vehicle as the vehicle that generated the highest sealed bid;

identifying the non-selected vehicle that vehicle that generated the second-highest sealed bid;

determining the number of tokens to transfer from the selected vehicle to the non-selected vehicle as equal to one greater than the number of tokens bid by the non-selected vehicle.

13. The system of claim 1, wherein the plurality of autonomous connected vehicles is configured to transmit information regarding the collective navigation plan to the remote consortium.

14. The system of claim 13, wherein the remote consortium is configured to store the transmitted information regarding the collective navigation plan as part of a distributed ledger.

15. The system of claim 1, wherein the plurality of reliability metrics are stored by the remote consortium as a plurality of vectors, each of the plurality of vectors associated with a respective one of the plurality of autonomous connected vehicles in the mesh network, wherein each of the vectors comprises a plurality of vector components, each of the plurality of vector components indicating a reliability of a respective characteristic the associated autonomous connected vehicle.

16. The system of claim 1, wherein the remote consortium is configured to store the plurality of reliability metrics as part of a distributed ledger.

17. The system of claim 1, wherein establishing the mesh network comprises defining the mesh network to include automated connected vehicles within a physical proximity boundary.

18. The system of claim 17, wherein the physical proximity boundary is defined in accordance with one of: a range of a communication component of one or more of the autonomous connected vehicles, and a range of a sensor of one or more of the autonomous connected vehicles.

19. The system of claim 17, wherein the mapped environment surrounding the plurality of autonomous connected vehicles corresponds to the area within the physical proximity boundary.

20. The system of claim 1, wherein establishing the mesh network comprises configuring the mesh network to include automated connected vehicles having one of: different electronic characteristics amongst one another; different sensor capabilities amongst one another; different communication capabilities amongst one another; different affiliation amongst one another; and different ownership amongst one another.

21. The system of claim 1, wherein each one of the plurality of reliability metrics is respectively associated with a respective one of the plurality of autonomous connected vehicles.

22. The system of claim 1, wherein the first electronic communication network comprises a cellular communication network.

23. The system of claim 1, wherein the mesh network is configured to allow transmission of data amongst the plurality of autonomous connected vehicles via a first electronic communication scheme different from an electronic scheme of the first electronic communication network.

24. The system of claim 1, wherein the mesh network is configured to allow transmission of data amongst the plurality of autonomous connected vehicles via short-wave radio transmission.

25. The system of claim 1, wherein the plurality of autonomous connected vehicles is further configured to navigate the environment in accordance with the map of the environment.

26. A method for optimizing cooperative actions among autonomous connected vehicles, comprising:
at a system comprising a plurality of autonomous connected vehicles, each of the plurality of vehicles comprising one or more processors configured to control navigation of the respective vehicle in an environment surrounding the plurality of autonomous connected vehicles:
establishing a mesh network comprising the plurality of autonomous connected vehicles;
receiving, from a remote consortium comprising a plurality of processors configured to send and receive data, via a first electronic communication network, to and from one or more of the plurality of autonomous connected vehicles, data regarding a plurality of reliability metrics associated with the plurality of autonomous vehicles in the mesh network;
collectively generating and storing, via the mesh network, a map of the environment surrounding the plurality of autonomous connected vehicles, wherein the map is generated in accordance with one or more of the plurality of reliability metrics received from the remote consortium; and
collectively generating and storing, via the mesh network, based on the map of the environment, a collective navigation plan for the plurality of autonomous connected vehicles to navigate the environment.

27. A non-transitory computer-readable storage medium for optimizing cooperative actions among autonomous connected vehicles, the non-transitory computer-readable storage medium storing instructions that, when executed by one or more processors of one or more of a plurality of autonomous connected vehicles, cause one or more of the plurality of autonomous connected vehicles to:
establish a mesh network comprising the plurality of autonomous connected vehicles;
receive, from a remote consortium comprising a plurality of processors configured to send and receive data, via a first electronic communication network, data regarding a plurality of reliability metrics associated with the plurality of autonomous vehicles in the mesh network;
collectively generate and store, via the mesh network, a map of an environment surrounding the plurality of autonomous connected vehicles, wherein the map is generated in accordance with one or more of the plurality of reliability metrics received from the remote consortium; and
collectively generate and store, via the mesh network, based on the map of the environment, a collective navigation plan for the plurality of autonomous connected vehicles to navigate the environment.

28. A system for tracking reliability of autonomous connected vehicles, comprising:
a plurality of autonomous connected vehicles, each of the plurality of vehicles comprising one or more processors configured to control navigation of the respective vehicle in an environment surrounding the plurality of autonomous connected vehicles;
wherein a first autonomous vehicle of the plurality of autonomous connected vehicles is configured to:
receive a transmission of first data, via a mesh network, from a second autonomous vehicle of the plurality of autonomous connected vehicles, the first data regarding a characteristic;
detect, via a sensor of the first autonomous vehicle, second data regarding the characteristic;
compare the first data and the second data to generate a comparison included in a report regarding the reliability of the second autonomous vehicle; and
transmit, via an electronic communication network different from the mesh network, to one or more remote servers, the report regarding the reliability of the second autonomous vehicle.

29. The system of claim 28, wherein the characteristic is a physical characteristic of the second autonomous vehicle.

30. The system of claim 28, wherein the characteristic is a physical characteristic of an environmental object different from the first autonomous vehicle and the second autonomous vehicle.

31. The system of claim 28, wherein:
the characteristic is an intended action of the second autonomous vehicle;
the first data regarding the characteristic is an advance indication that the second autonomous vehicle will perform the intended action; and
the second data regarding the characteristic is an observation of whether or not the second autonomous vehicle performed the intended action.

32. A method for tracking reliability of autonomous connected vehicles, comprising:
at a first autonomous vehicle included in a plurality of autonomous connected vehicles, each of the plurality of vehicles comprising one or more processors configured to control navigation of the respective vehicle in an environment surrounding the plurality of autonomous connected vehicles:
receiving a transmission of first data, via a mesh network, from a second autonomous vehicle of the plurality of autonomous connected vehicles, the first data regarding a characteristic;
detecting, via a sensor of the first autonomous vehicle, second data regarding the characteristic;

comparing the first data and the second data to generate a comparison included in a report regarding the reliability of the second autonomous vehicle; and transmitting, via an electronic communication network different from the mesh network, to one or more remote servers, the report regarding the reliability of the second autonomous vehicle.

33. A non-transitory computer-readable storage medium for tracking reliability of autonomous connected vehicles, the non-transitory computer-readable storage medium storing instructions that, when executed by a first autonomous vehicle included in a plurality of autonomous connected vehicles, cause first autonomous connected vehicle to:

receive a transmission of first data, via a mesh network, from a second autonomous vehicle of the plurality of autonomous connected vehicles, the first data regarding a characteristic;

detect, via a sensor of the first autonomous vehicle, second data regarding the characteristic;

compare the first data and the second data to generate a comparison included in a report regarding the reliability of the second autonomous vehicle; and transmit, via an electronic communication network different from the mesh network, to one or more remote servers, the report regarding the reliability of the second autonomous vehicle.

* * * * *